United States Patent
Haynes et al.

(10) Patent No.: US 7,488,441 B2
(45) Date of Patent: *Feb. 10, 2009

(54) USE OF A PULSATING POWER SUPPLY FOR ELECTROSTATIC CHARGING OF NONWOVENS

(75) Inventors: Bryan David Haynes, Cumming, GA (US); Daniel Kenneth Schiffer, Marietta, GA (US); Robert James Baldy, Alpharetta, GA (US); Douglas Jay Hulslander, Woodstock, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 1106 days.

This patent is subject to a terminal disclaimer.

(21) Appl. No.: 10/325,140

(22) Filed: Dec. 20, 2002

(65) Prior Publication Data

US 2003/0233735 A1 Dec. 25, 2003

Related U.S. Application Data

(60) Provisional application No. 60/389,257, filed on Jun. 15, 2002.

(51) Int. Cl.
*D01D 5/12* (2006.01)
*D04H 3/02* (2006.01)
*D06M 10/00* (2006.01)

(52) U.S. Cl. .................... 264/465; 264/103; 264/210.8; 264/555

(58) Field of Classification Search ......... 264/109–128, 264/405–496
See application file for complete search history.

(56) References Cited

U.S. PATENT DOCUMENTS

| | | | |
|---|---|---|---|
| 705,691 | A | 7/1902 | Morton |
| 2,810,426 | A | 10/1957 | Till et al. |
| 3,097,056 | A | 7/1963 | Rowlinson |
| 3,117,055 | A | 1/1964 | Guandique et al. |
| 3,163,753 | A | 12/1964 | Sabato et al. |

(Continued)

FOREIGN PATENT DOCUMENTS

| | | |
|---|---|---|
| DE | 25 13 251 | 9/1976 |
| DE | 196 50 608 | 6/1998 |
| DE | 19650607 | 6/1998 |
| EP | 0 245 108 | 1/1994 |
| EP | 0 515 414 | 6/1994 |

(Continued)

OTHER PUBLICATIONS

*Polymer Blends and Composites*, John A. Manson and Leslie H. Sperling, copyright 1976, Plenum Press, ISBN-0-306-30831-2, pp. 273-277.

*Primary Examiner*—Leo B Tentoni
(74) *Attorney, Agent, or Firm*—Dority & Manning, P.A.

(57) ABSTRACT

Described herein are improvements to processes and equipment for the manufacture of nonwoven webs useful in numerous applications including personal care, protective apparel, and industrial products. The fiber and/or filaments used to form the nonwoven fabric are deposited on a forming surface in a controlled orientation using application of an electrostatic charge to the fibers and/or filaments in combination with directing them to an electrode deflector plate while under the influence of the charge. The plate may be made up of teeth with a separation and angle orientation that are selected in accordance with the desired arrangement of the fibers and/or filaments in the nonwoven web. As a result, properties of the web such as relative strengths in the machine direction and cross-machine direction can be controlled. The charging of the pins is controlled so that not all pins remain at maximum charge during a cycle with the result that extended run times may be obtained.

14 Claims, 7 Drawing Sheets

U.S. PATENT DOCUMENTS

| | | |
|---|---|---|
| 3,314,122 A | 4/1967 | Bundy |
| 3,325,906 A | 6/1967 | Fanke |
| 3,338,992 A | 8/1967 | Kinney |
| 3,341,394 A | 9/1967 | Kinney |
| 3,402,227 A | 9/1968 | Knee |
| 3,433,857 A | 3/1969 | Dutton et al. |
| 3,490,115 A | 1/1970 | Owens et al. |
| T871,003 I4 | 2/1970 | Debbas |
| 3,502,763 A | 3/1970 | Hartmann |
| 3,542,615 A | 11/1970 | Dobo et al. |
| 3,563,838 A | 2/1971 | Edwards |
| 3,578,739 A | 5/1971 | George |
| 3,624,736 A | 11/1971 | Iwami |
| 3,634,726 A | 1/1972 | Jay |
| 3,655,305 A | 4/1972 | Baxter et al. |
| 3,689,608 A | 9/1972 | Hollberg et al. |
| 3,692,618 A | 9/1972 | Dorschner et al. |
| 3,711,898 A | 1/1973 | Debbas |
| 3,777,231 A | 12/1973 | Guschin |
| 3,802,817 A | 4/1974 | Matsuki et al. |
| 3,824,052 A | 7/1974 | Fowler |
| 3,849,241 A | 11/1974 | Butin et al. |
| 3,855,046 A | 12/1974 | Hansen et al. |
| 3,860,369 A | 1/1975 | Brethauer et al. |
| 3,967,118 A | 6/1976 | Sternberg |
| 4,009,508 A | 3/1977 | Sternberg |
| 4,041,203 A | 8/1977 | Brock et al. |
| 4,124,673 A | 11/1978 | Pieper et al. |
| 4,208,366 A | 6/1980 | Kinney |
| 4,233,014 A | 11/1980 | Kinney |
| 4,340,563 A | 7/1982 | Appel et al. |
| 4,374,888 A | 2/1983 | Bornslaeger |
| 4,380,104 A | 4/1983 | Kamioka et al. |
| 4,430,277 A | 2/1984 | Lin |
| 4,486,365 A | 12/1984 | Kliemann et al. |
| 4,517,143 A | 5/1985 | Kisler |
| 4,666,395 A | 5/1987 | Shah |
| 4,795,668 A | 1/1989 | Krueger et al. |
| 4,810,432 A | 3/1989 | Kisler |
| 4,904,174 A | 2/1990 | Moosmayer et al. |
| 4,968,238 A | 11/1990 | Satterfield et al. |
| 5,045,248 A | 9/1991 | Satterfield et al. |
| 5,051,159 A | 9/1991 | Togashi et al. |
| 5,057,368 A | 10/1991 | Largman et al. |
| 5,069,970 A | 12/1991 | Largman et al. |
| 5,095,400 A | 3/1992 | Saito |
| 5,108,820 A | 4/1992 | Kaneko et al. |
| 5,108,827 A | 4/1992 | Gessner |
| 5,122,048 A | 6/1992 | Deeds |
| 5,145,727 A | 9/1992 | Potts et al. |
| 5,169,706 A | 12/1992 | Collier, IV et al. |
| 5,178,931 A | 1/1993 | Perkins et al. |
| 5,188,885 A | 2/1993 | Timmons et al. |
| 5,200,620 A | 4/1993 | Peritt et al. |
| 5,225,018 A | 7/1993 | Zeldin et al. |
| 5,227,172 A | 7/1993 | Deeds |
| 5,254,297 A | 10/1993 | Deeds |
| 5,277,976 A | 1/1994 | Hogle et al. |
| 5,294,482 A | 3/1994 | Gessner |
| 5,296,172 A | 3/1994 | Davis et al. |
| 5,312,500 A | 5/1994 | Kurihara et al. |
| 5,336,552 A | 8/1994 | Strack et al. |
| 5,382,400 A | 1/1995 | Pike et al. |
| 5,397,413 A | 3/1995 | Trimble et al. |
| 5,421,901 A | 6/1995 | Whitney et al. |
| 5,466,410 A | 11/1995 | Hills |
| 5,533,244 A | 7/1996 | Wadzinski |
| 5,540,992 A | 7/1996 | Marcher et al. |
| 5,731,011 A | 3/1998 | Agreen et al. |
| 5,762,857 A | 6/1998 | Weng et al. |
| 5,783,503 A | 7/1998 | Gillespie et al. |
| 5,804,512 A | 9/1998 | Lickfield et al. |
| 5,805,407 A | 9/1998 | Takano et al. |
| 5,821,178 A | 10/1998 | Cohen |
| 5,834,384 A | 11/1998 | Cohen et al. |
| 5,846,356 A | 12/1998 | Vyakarnam et al. |
| 5,888,340 A | 3/1999 | Vyakarnam et al. |
| 5,998,308 A | 12/1999 | Cohen |
| 6,057,256 A | 5/2000 | Krueger et al. |
| 6,797,101 B2 * | 9/2004 | Ferencz et al. ............... 156/167 |

FOREIGN PATENT DOCUMENTS

| | | |
|---|---|---|
| EP | 0 453 564 | 7/1995 |
| EP | 0 635 077 | 7/1996 |
| EP | 0 949 362 | 10/1999 |
| EP | 0 950 744 | 10/1999 |
| EP | 1 022 363 | 7/2000 |
| FR | 2 815 646 | 4/2002 |
| JP | 59 187659 | 10/1984 |
| JP | 07-258949 | 10/1995 |
| JP | 09-310260 | 12/1997 |
| JP | 10-251959 | 9/1998 |
| JP | 11-131355 | 5/1999 |
| WO | 90/14228 | 11/1990 |
| WO | 91/07530 | 5/1991 |
| WO | 91/19034 | 12/1991 |
| WO | 92/20511 | 11/1992 |
| WO | 94/08779 | 4/1994 |
| WO | 01/61082 | 8/2001 |

* cited by examiner

USE OF A PULSATING POWER SUPPLY FOR ELECTROSTATIC CHARGING OF NONWOVENS

This application claims priority from U.S. Provisional Application No. 60/389,257 filed on Jun. 15, 2002.

FIELD OF THE INVENTION

This invention is directed to a method and apparatus for controlling fiber or filament distribution and orientation in the manufacture of nonwoven fabrics, including spunbond nonwovens, as well as to the resulting nonwovens having a desired fiber or filament distribution and orientation. More particularly, this invention is directed to a controlled application of an electrostatic field in combination with specific target electrode deflection means acting on fibers or filaments prior to deposition on a forming wire or other web forming means. The design of the deflector means located below fiber drawing means, when combined with the controlled application of electrostatics provides separation of the fibers or filaments and directional distribution on the forming surface to result in webs with desired preferential orientation and resulting web properties. The invention also includes a method of producing spunbond and other nonwoven fabrics that can be tailored to achieve a wide variety of physical and other properties for numerous applications in personal care, health care, protective apparel and industrial products.

BACKGROUND

Nonwoven fabrics or webs constitute all or part of numerous commercial products such as adult incontinence products, sanitary napkins, disposable diapers and hospital gowns. Nonwoven fabrics or webs have a physical structure of individual fibers, strands or threads which are interlaid, but not in a regular, identifiable manner as in a knitted or woven fabric. The fibers may be continuous or discontinuous, and are frequently produced from thermoplastic polymer or copolymer resins from the general classes of polyolefins, polyesters and polyamides, as well as numerous other polymers. Blends of polymers or conjugate multicomponent fibers may also be employed. Methods and apparatus for forming fibers and producing a nonwoven web from synthetic fibers are well known; common techniques and include meltblowing, spunbonding and carding. Nonwoven fabrics may be used individually or in composite materials as in a spunbond/meltblown (SM) laminate or a three-layered spunbond/meltblown/spunbond (SMS) fabric. They may also be used in conjunction with films and may be bonded, embossed, treated or colored. Colors may be achieved by the addition of an appropriate pigment to the polymeric resin. In addition to pigments, other additives may be utilized to impart specific properties to a fabric, such as in the addition of a fire retardant to impart flame resistance or the use of inorganic particulate matter to improve porosity. Because they are made from polymer resins such as polyolefins, nonwoven fabrics are usually extremely hydrophobic. In order to make these materials wettable, surfactants can be added internally or externally. Furthermore, additives such as wood pulp or fluff can be incorporated into the web to provide increased absorbency and decreased web density. Such additives are well known in the art. Bonding of nonwoven fabrics can be accomplished by a variety of methods typically based on heat and/or pressure, such as through air bonding and thermal point bonding. Ultrasonic bonding, hydroentangling and stitchbonding may also be used. There exist numerous bonding and embossing patterns that can be selected for texture, physical properties and appearance. Qualities such as strength, softness, elasticity, absorbency, flexibility and breathability are readily controlled in making nonwovens. However, certain properties must often be balanced against others. An example would be an attempt to lower costs by decreasing fabric basis weight while maintaining reasonable strength. Nonwoven fabrics can be made to feel cloth-like or plastic-like as desired. The average basis weight of nonwoven fabrics for most applications is generally between 5 grams per square meter and 300 grams per square meter, depending on the desired end use of the material. Nonwoven fabrics have been used in the manufacture of personal care products such as disposable infant diapers, children's training pants, feminine pads and incontinence garments. Nonwoven fabrics are particularly useful in the realm of such disposable absorbent products because it is possible to produce them with desirable cloth-like aesthetics at a low cost. Nonwoven personal care products have had wide consumer acceptance. The elastic properties of some nonwoven fabrics have allowed them to be used in form-fitting garments, and their flexibility enables the wearer to move in a normal, unrestricted manner. The SM and SMS laminate materials combine the qualities of strength, vapor permeability and barrier properties; such fabrics have proven ideal in the area of protective apparel. Sterilization wrap and surgical gowns made from such laminates are widely used because they are medically effective, comfortable and their cloth-like appearance familiarizes patients to a potentially alienating environment. Other industrial applications for such nonwovens include wipers, sorbents for oil and the like, filtration, and covers for automobiles and boats, just to name a few.

It is widely recognized that properties relating to strength and barrier of nonwoven fabrics are a function of the uniformity and directionality of the fibers or filaments in the web. Various attempts have been made to distribute the fibers or filaments within the web in a controlled manner. These attempts have included the use of electrostatics to impart a charge to the fibers or filaments, the use of spreader devices to direct the fibers or filaments, the use of deflector means for the same purpose, and reorienting the fiber forming means. However, it remains desired to achieve still further capability to gain this control in a way that is consistent with costs dictated by the disposable applications for many of these nonwovens.

SUMMARY OF THE INVENTION

The present invention includes the use of electrostatics in an arrangement that provides extended periods of time between machine downtime for cleaning. Particularly when used in a spunbond process, the resulting process and arrangement reduces the tendency to collect fibers or filaments on electrode pins by alternating the flow of current to selected sets of pins resulting in less than the total available pins charged at a given point in time. The number of charged pins at all times is sufficient to achieve the desired electrostatic effect. The invention is applicable to spinning a wide variety of polymers in monocomponent, biconstituent or conjugate filaments and using many different bonding steps, such as patterned thermal or ultrasonic bonding as well as adhesive bonding. Also, the filaments or fibers may vary widely in denier, cross-sectional shape and the like and may be combined as mixtures of the foregoing. Single layer nonwoven webs or multilayer laminates may be formed in accordance with the invention.

The invention provides a process for forming a nonwoven web includes the steps of:

a. providing a source of fibers and/or filaments;
b. subjecting the fibers and/or filaments to an electrostatic charge using a pin array;
c. selectively charging pins in said array so that less than the total number of pins is fully charged at some point in time in an operation cycle;
d. varying the charge level and/or pins that are charged while maintaining the desired electrostatic effect; and
e. collecting the fibers and/or filaments on a forming surface to form a nonwoven web.

In one embodiment the fibers and/or filaments are provided by melt spinning. In a further aspect the meltspun filaments may be continuous and subjected to pneumatic draw forces in a fiber draw unit prior to being subjected to said electrostatic charge. In a specific embodiment the deflector device includes a series of teeth separated by a distance determined by the desired orientation of the fibers and/or filaments in the nonwoven web. Also, in one aspect the teeth are oriented at an angle with respect to the directed fibers and/or filaments, the angle determined by the desired orientation of the fibers and/or filaments in the nonwoven web. In another aspect of the present invention, the pin array is formed in a containment system that facilitates removal of pins for cleaning and also provides a seal for control of air movement that might cause contamination or fouling of the pins or otherwise adversely affect forming the fibers or filaments into a nonwoven web. The invention also includes the apparatus and resulting nonwoven webs.

DETAILED DESCRIPTION

Definitions

Figure 1:
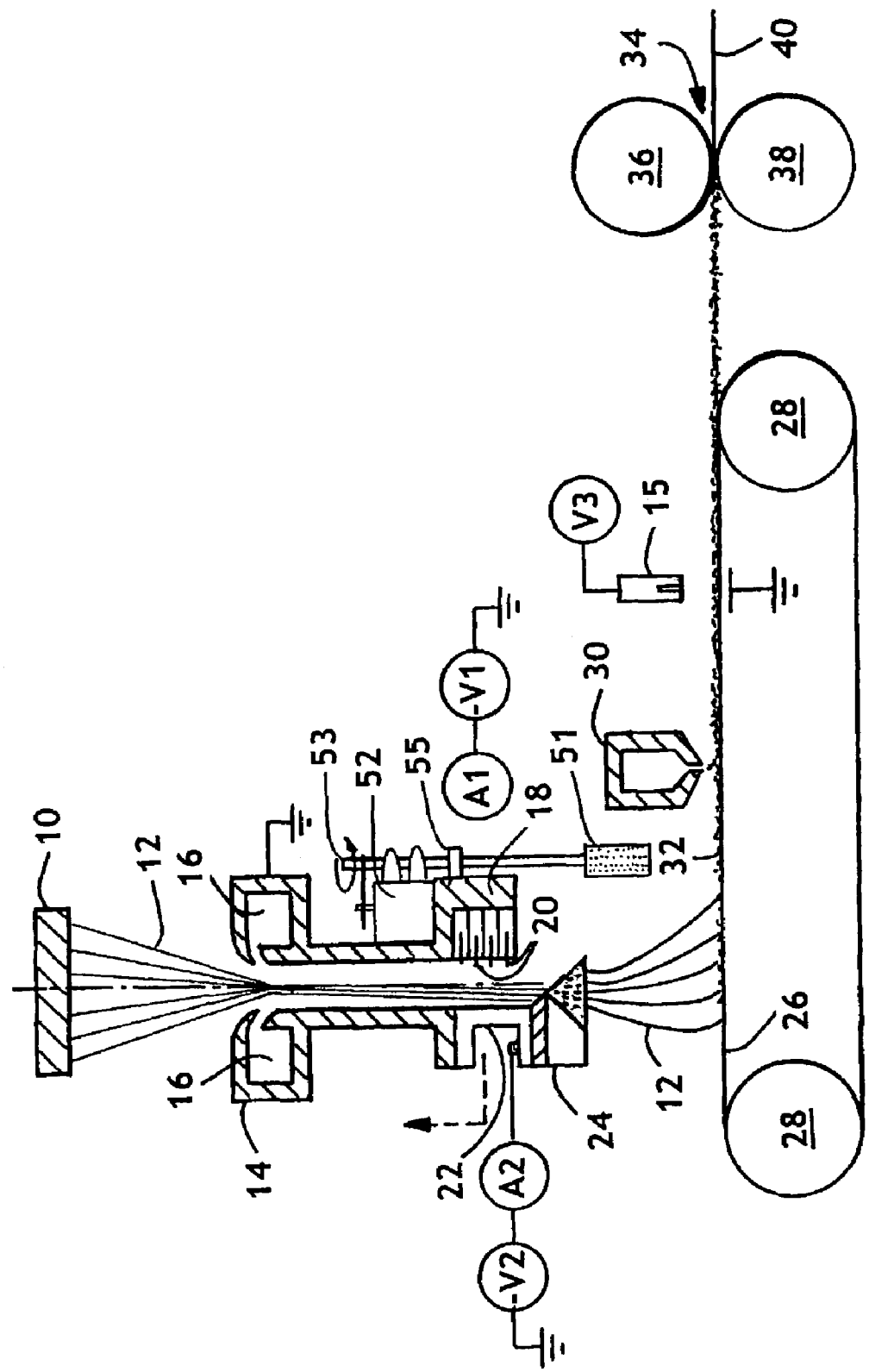
FIG. 1 is a schematic illustration of a spunbond process including the fiber or filament control of the invention.

As used herein and in the claims, the term "comprising" is inclusive or open-ended and does not exclude additional unrecited elements, compositional components, or method steps.

As used herein the term "nonwoven fabric or web" means a web having a structure of individual fibers or threads which are interlaid, but not in an identifiable manner as in a knitted fabric. Nonwoven fabrics or webs have been formed from many processes such as for example, meltblowing processes, spunbonding processes, and bonded carded web processes. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91).

As used herein "charge cycle" refers to the time during which all pins in the electrostatic array have experienced both the highest and lowest level of charge.

As used herein the term "microfibers" means small diameter fibers having an average diameter not greater than about 75 microns, for example, having an average diameter of from about 0.5 microns to about 50 microns, or more particularly, microfibers may have an average diameter of from about 2 microns to about 25 microns. Another frequently used expression of fiber diameter is denier, which is defined as grams per 9000 meters of a fiber and may be calculated as fiber diameter in microns squared, multiplied by the density in grams/cc, multiplied by 0.00707. A lower denier indicates a finer fiber and a higher denier indicates a thicker or heavier fiber. For example, the diameter of a polypropylene fiber given as 15 microns may be converted to denier by squaring, multiplying the result by 0.89 g/cc and multiplying by 0.00707. Thus, a 15 micron polypropylene fiber has a denier of about 1.42 ($15^2 \times 0.89 \times 0.00707 = 1.415$). Outside the United States the unit of measurement is more commonly the "tex", which is defined as the grams per kilometer of fiber. Tex may be calculated as denier/9.

As used herein the term "spunbonded fibers" refers to small diameter fibers which are formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, and U.S. Pat. No. 3,542,615 to Dobo et al. Spunbond fibers are generally not tacky when they are deposited onto a collecting surface. Spunbond fibers are generally continuous and have average diameters (from a sample of at least 10) larger than 7 microns, more particularly, between about 10 and 20 microns. The fibers may also have shapes such as those described in U.S. Pat. No. 5,277,976 to Hogle et al., U.S. Pat. No. 5,466,410 to Hills and U.S. Pat. Nos. 5,069,970 and 5,057,368 to Largman et al., which describe fibers with unconventional shapes.

As used herein the term "meltblown fibers" means fibers formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin et al. Meltblown fibers are microfibers which may be continuous or discontinuous, are generally smaller than 10 microns in average diameter, and are generally tacky when deposited onto a collecting surface.

As used herein "multilayer laminate" means a laminate wherein some of the layers may be spunbond and some meltblown such as a spunbond/meltblown/spunbond (SMS) laminate and others as disclosed in U.S. Pat. No. 4,041,203 to Brock et al., U.S. Pat. No. 5,169,706 to Collier, et al, U.S. Pat. No. 5,145,727 to Potts et al., U.S. Pat. No. 5,178,931 to Perkins et al. and U.S. Pat. No. 5,188,885 to Timmons et al. Such a laminate may be made by sequentially depositing onto a moving forming belt first a spunbond fabric layer, then a meltblown fabric layer and last another spunbond layer and then bonding the laminate in a manner described below. Alternatively, the fabric layers may be made individually, collected in rolls, and combined in a separate bonding step. Such fabrics usually have a basis weight of from about 0.1 to 12 osy (6 to 400 gsm), or more particularly from about 0.75 to about 3 osy. Multilayer laminates may also have various numbers of meltblown layers or multiple spunbond layers in many different is configurations and may include other materials like films (F) or conform materials, e.g. SMMS, SM, SFS, etc.

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" includes all possible geometrical configurations of the molecule. These configurations include, but are not limited to isotactic, syndiotactic and random symmetries.

As used herein, the term "machine direction" or MD means the length of a fabric in the direction in which it is produced. The term "cross machine direction" or CD means the width of fabric, i.e. a direction generally perpendicular to the MD.

As used herein the term "monocomponent" fiber refers to a fiber formed from one or more extruders using only one polymer. This is not meant to exclude fibers formed from one polymer to which small amounts of additives have been added for color, antistatic properties, lubrication, hydrophilicity, etc. These additives, e.g. titanium dioxide for color, are generally present in an amount less than 5 weight percent and more typically about 2 weight percent.

As used herein the term "conjugate fibers" refers to fibers which have been formed from at least two polymers extruded from separate extruders but spun together to form one fiber. Conjugate fibers are also sometimes referred to as multicomponent or bicomponent fibers. The polymers are usually different from each other though conjugate fibers may be monocomponent fibers. The polymers are arranged in substantially constantly positioned distinct zones across the cross-section of the conjugate fibers and extend continuously along the length of the conjugate fibers. The configuration of such a conjugate fiber may be, for example, a sheath/core arrangement wherein one polymer is surrounded by another or may be a side by side arrangement, a pie arrangement or an "islands-in-the-sea" arrangement. Conjugate fibers are taught in U.S. Pat. No. 5,108,820 to Kaneko et al., U.S. Pat. No. 4,795,668 to Krueger et al., U.S. Pat. No. 5,540,992 to Marcher et al. and U.S. Pat. No. 5,336,552 to Strack et al. Conjugate fibers are also taught in U.S. Pat. No. 5,382,400 to Pike et al. and may be used to produce crimp in the fibers by using the differential rates of expansion and contraction of the two (or more) polymers. Crimped fibers may also be produced by mechanical means and by the process of German Patent DT 25 13 251 A1. For two component fibers, the polymers may be present in ratios of 75/25, 50/50, 25/75 or any other desired ratios. The fibers may also have shapes such as those described in U.S. Pat. No. 5,277,976 to Hogle et al., U.S. Pat. Nos. 5,466,410 to Hills and 5,069,970 and 5,057,368 to Largman et al., which describe fibers with unconventional shapes.

As used herein the term "biconstituent fibers" refers to fibers which have been formed from at least two polymers extruded from the same extruder as a blend. The term "blend" is defined below. Biconstituent fibers do not have the various polymer components arranged in relatively constantly positioned distinct zones across the cross-sectional area of the fiber and the various polymers are usually not continuous along the entire length of the fiber, instead usually forming fibrils or protofibrils which start and end at random. Biconstituent fibers are sometimes also referred to as multiconstituent fibers. Fibers of this general type are discussed in, for example, U.S. Pat. Nos. 5,108,827 and 5,294,482 to Gessner. Bicomponent and biconstituent fibers are also discussed in the textbook *Polymer Blends and Composites* by John A. Manson and Leslie H. Sperling, copyright 1976 by Plenum Press, a division of Plenum Publishing Corporation of New York, IBSN 0-306-30831-2, at pages 273 through 277.

As used herein the term "blend" means a mixture of two or more polymers while the term "alloy" means a sub-class of blends wherein the components are immiscible but have been compatibilized. "Miscibility" and "immiscibility" are defined as blends having negative and positive values, respectively, for the free energy of mixing. Further, "compatibilization" is defined as the process of modifying the interfacial properties of an immiscible polymer blend in order to make an alloy.

"Bonded carded web" refers to webs that are made from staple fibers which are sent through a combing or carding unit, which breaks apart and aligns the staple fibers in the machine direction to form a generally machine direction-oriented fibrous nonwoven web. Such fibers are usually purchased in bales which are placed in a picker which separates the fibers prior to the carding unit. Once the web is formed, it then is bonded by one or more of several known bonding methods. One such bonding method is powder bonding, wherein a powdered adhesive is distributed throughout the web and then activated, usually by heating the web and adhesive with hot air. Another suitable bonding method is pattern bonding, wherein heated calender rolls or ultrasonic bonding equipment are used to bond the fibers together, usually in a localized bond pattern, though the web can be bonded across its entire surface if so desired. Another suitable and well-known bonding method, particularly when using bicomponent staple fibers, is through-air bonding.

As used herein, "ultrasonic bonding" means a process performed, for example, by passing the fabric between a sonic horn and anvil roll as illustrated in U.S. Pat. No. 4,374,888 to Bornslaeger.

As used herein "thermal point bonding" involves passing a fabric or web of fibers to be bonded between a heated calender roll and an anvil roll. The calender roll is usually, though not always, patterned in some way so that the entire fabric is not bonded across its entire surface, and the anvil roll is usually flat. As a result, various patterns for calender rolls have been developed for functional as well as aesthetic reasons. One example of a pattern has points and is the Hansen Pennings or "H&P" pattern with about a 30% bond area with about 200 bonds/square inch as taught in U.S. Pat. No. 3,855,046 to Hansen and Pennings. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5%. Another typical point bonding pattern is the expanded Hansen Pennings or "EHP" bond pattern which produces a 15% bond area with a square pin having a side dimension of 0.037 inches (0.94 mm), a pin spacing of 0.097 inches (2.464 mm) and a depth of 0.039 inches (0.991 mm). Another typical point bonding pattern designated "714" has square pin bonding areas wherein each pin has a side dimension of 0.023 inches, a spacing of 0.062 inches (1.575 mm) between pins, and a depth of bonding of 0.033 inches (0.838 mm). The resulting pattern has a bonded area of about 15%. Yet another common pattern is the C-Star pattern which has a bond area of about 16.9%. The C-Star pattern has a cross-directional bar or "corduroy" design interrupted by shooting stars. Other common patterns include a diamond pattern with repeating and slightly offset diamonds with about a 16% bond area and a wire weave pattern looking as the name suggests, e.g. like a window screen, with about a 19% bond area. Typically, the percent bonding area varies from around 10% to around 30% of the area of the fabric laminate web. As in well known in the art, the spot bonding holds the laminate layers together as well as imparts integrity to each individual layer by bonding filaments and/or fibers within each layer.

As used herein, the term "personal care product" means diapers, training pants, swimwear, absorbent underpants, adult incontinence products, and feminine hygiene products. It also includes absorbent products for veterinary and mortuary applications.

As used herein, the term "protective cover" means a cover for vehicles such as cars, trucks, boats, airplanes, motorcycles, bicycles, golf carts, etc., covers for equipment often left outdoors like grills, yard and garden equipment (mowers, rototillers, etc.) and lawn furniture, as well as floor coverings, table cloths and picnic area covers.

As used herein, the term "outdoor fabric" means a fabric which is primarily, though not exclusively, used outdoors. Outdoor fabric includes fabric used in protective covers, camper/trailer fabric, tarpaulins, awnings, canopies, tents, agricultural fabrics and outdoor apparel such as head coverings, industrial work wear and coveralls, pants, shirts, jackets, gloves, socks, shoe coverings, and the like.

Description

Turning to FIG. 1, there is shown an example of a spunbond nonwoven forming process in accordance with the invention. As illustrated, spinplate 10 receives polymer from a conventional melt extrusion system (not shown) and forms filaments 12 which may be monocomponent, conjugate or biconstituent as described above. Fiber draw unit 14 includes a source of drawing air from chambers 16 directed at high velocity pulling filaments 12 causing orientation of the filaments, increasing their strength properties. Below the fiber draw unit 14 there is shown electrostatics unit 18 including rows 20 of pins producing a corona discharge against target electrodes 22 and deflector 24. The charged filaments 12 then are directed to the forming wire 26 moving around rolls 28, one or both of which may be driven. In some cases a number of filaments may tend to accumulate on or around the electrostatics unit 18 or fiber draw unit 14. A device such as rotating brush 51 may be used to clear any undesired accumulation. Shown in the arrangement of FIG. 1, the brush may be mounted as by rod 53 and support slot 55 on electrostatics unit 18 and may be driven by motor 52 to traverse the width of the fiber draw unit 14 and rotate during this traverse so as to collect loose filaments. As will be understood by those skilled in the art, the brush may be operated manually as by a pulley device, and other similar filament clearing means may be employed. A compaction device such as air knife 30 may be used to consolidate web 32 prior to bonding nip 34 between calender rolls 36, 38 (one or both of which may be patterned as described above) which form bonded web 40. If desired, conventional means 15 for removing or reducing the charge on the web may be employed such as applying an oppositely charged field or ion cloud. Such devices are known and described, for example, in U.S. Pat. No. 3,624,736 to Jay, incorporated herein in its entirety by reference.

It will be recognized by those skilled in the art that various combinations of charge polarity may be used in carrying out the invention. For example, with reference to FIG. 1, the following chart illustrates exemplary alternatives. A charge of zero indicates the device is connected to ground.

| $V_1$ | $V_2$ | $V_3$ |
|---|---|---|
| − | + | + |
| − | 0 | + |
| + | − | − |
| + | 0 | − |

Figure 2:
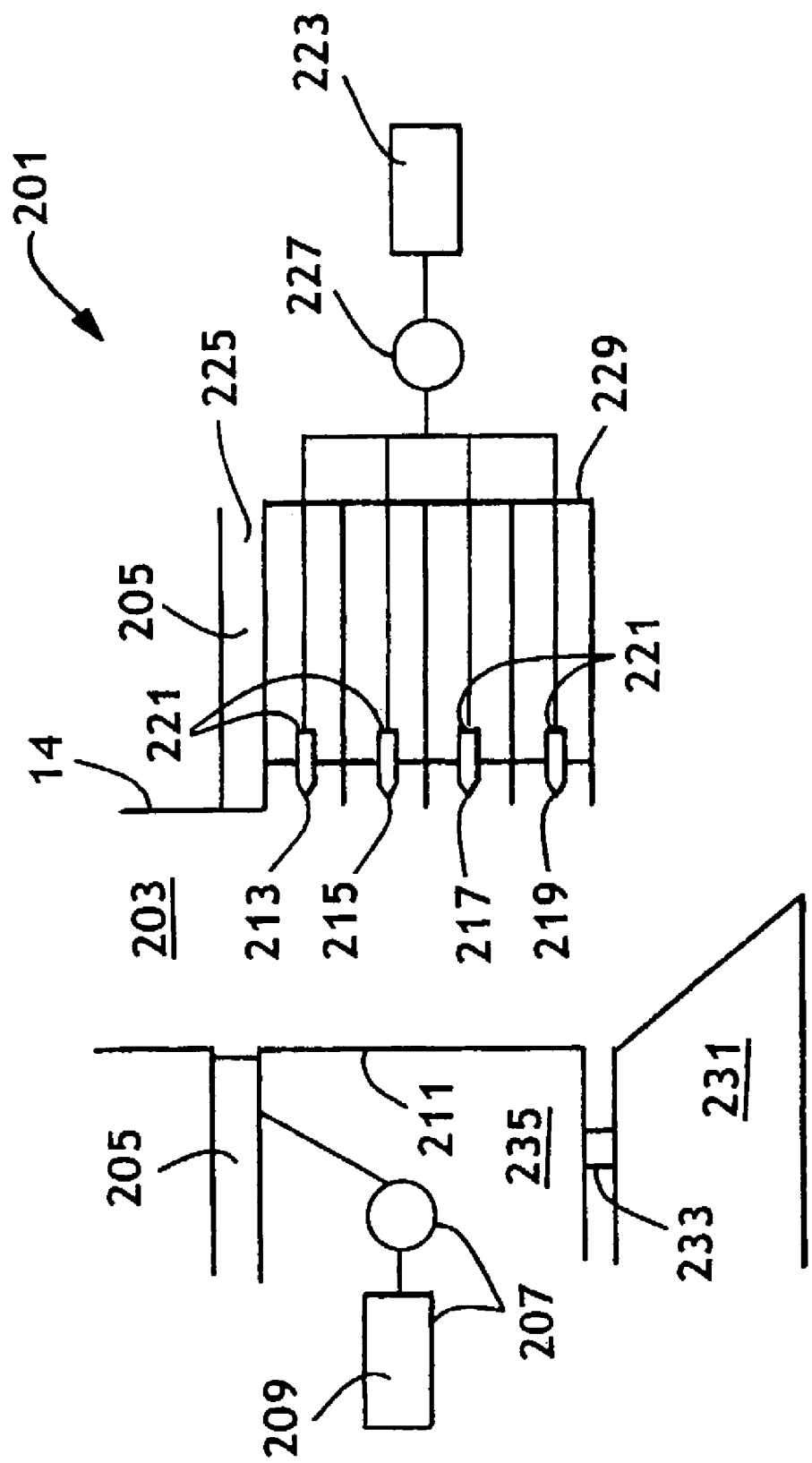
FIG. 2 is an enlarged view of the combined electrostatics and segmented target electrode deflector device in accordance with the invention.

Turning to FIG. 2, there is shown a view of one corona discharge arrangement 201 useful in accordance with the invention. The exit from fiber draw unit 14 is indicated at 203 and is separated by insulation 205, 225 from ammeter 207, 227 connected to power supply 209 forming target 235 including plate 211. The electrode array 229 is comprised of multiple bars, for example four bars 213, 215, 217, 219, each of which contains a plurality of recessed emitter pins 221. Also forming part of the target 235 is deflector 231 attached by conductive means such as bolt 233 to plate 211. The deflector target can be isolated from or connected to the target plate by a conductive means.

In accordance with the invention the tendency of emitter pins 221 to collect or accumulate fibers or filaments in operation is significantly reduced. As is known, when fibers or filaments (or other additives or containments) collect on emitter pins, the effectiveness of such pins is reduced and, ultimately, operation of the web forming equipment must cease until the pins have been cleaned. We have found, in accordance with the invention, that operating time between cleanings can be extended by selective activation of pins in a manner that certain pins are uncharged or charged at a lower level during a cycle of operation. In one embodiment adjacent pins in an array are either charged or uncharged at the same time alternatively. The period of charged/uncharged operation may vary widely depending on the system from under a second to hours or even days. For example, rapid changes may require sophisticated electronics while changes each shift of operation may simply be operator controlled. In a second embodiment alternating current 223 is used to provide periods of charge/uncharge operation to all pins. In any case, the current is selected so as to maintain the desired charge level applied to the fibers or filaments.

Figure 3:
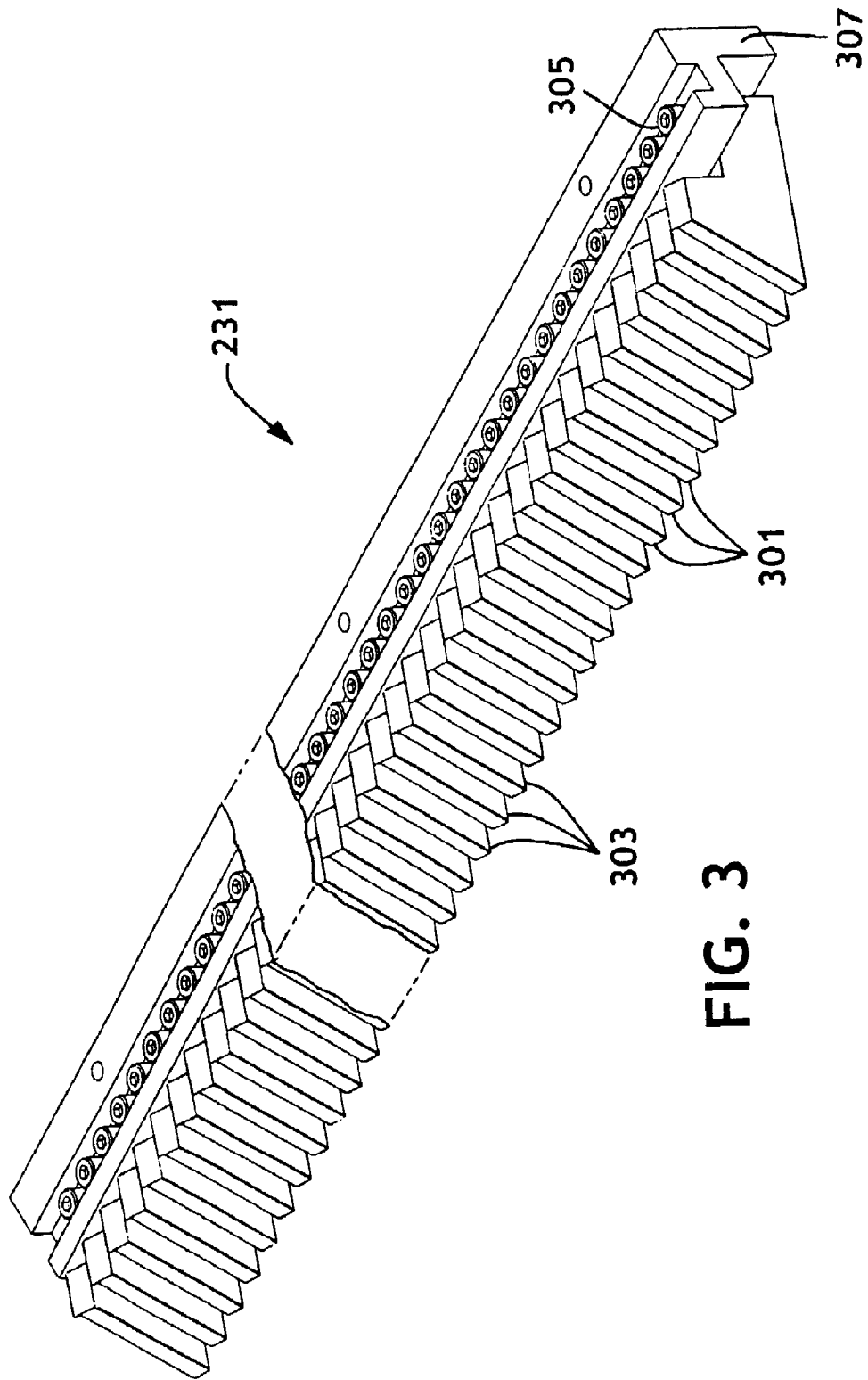
FIG. 3 is a detailed view of a target electrode deflector device in accordance with the invention.

Turning to FIG. 3, there is shown a perspective view of one target electrode deflector 231 in accordance with the invention. The deflector is segmented by grooves 301 formed by teeth 303 mounted by bolts 305 to support 307. Although not apparent from the drawing, teeth 303 may be separated by a spacing of, for example, about one eighth inch to provide for additional control of fiber distribution. The shape and spacing of the teeth 303 may be varied to produce intended degrees of fiber separation and orientation on laydown.

Figure 4:
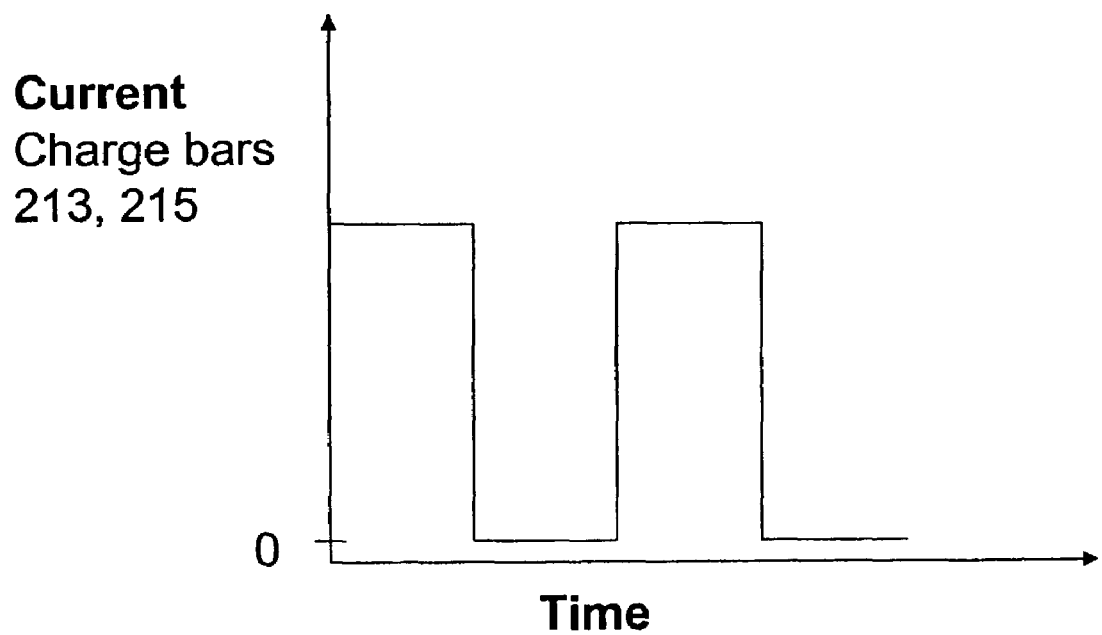
FIGS. 4 and 5 illustrate one operating format for pin arrays that alternate charged and uncharged states.
Figure 5:
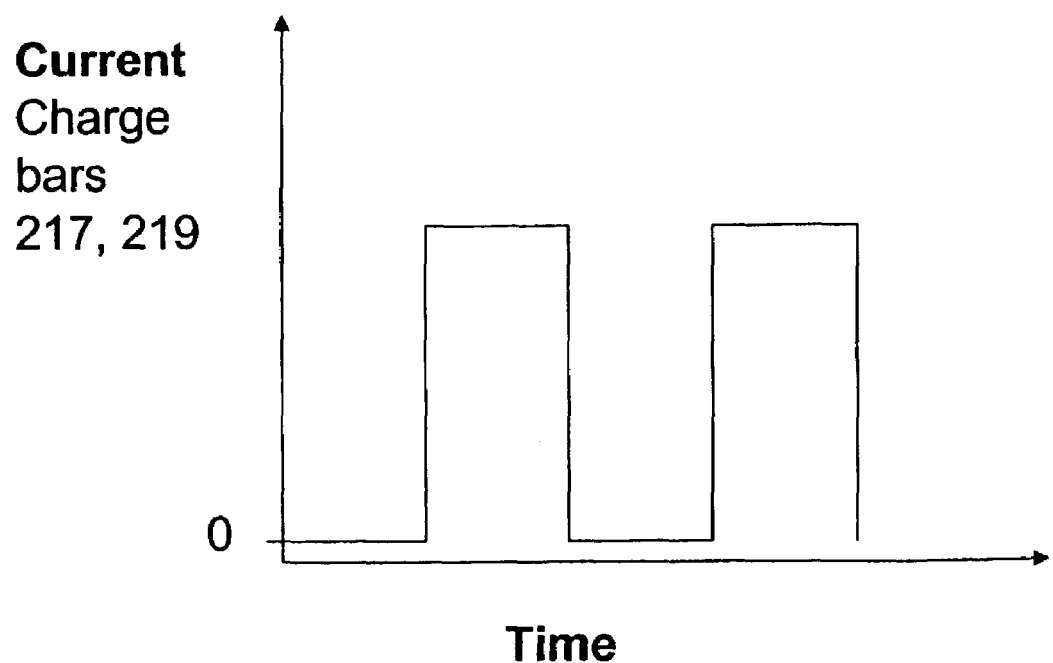

Turning to FIGS. 4 and 5, a cycle is shown where charge bars 213, 215 are charged at any point in time that charge bars 217, 219 are uncharged, and the reverse is also true. In other words, charge bars 213, 215 are switched on and simultaneously charge bars 217, 219 are switched off, then charge bars 217, 219 are switched on and simultaneously charge bars 213, 215 are switched off.

Figure 6:
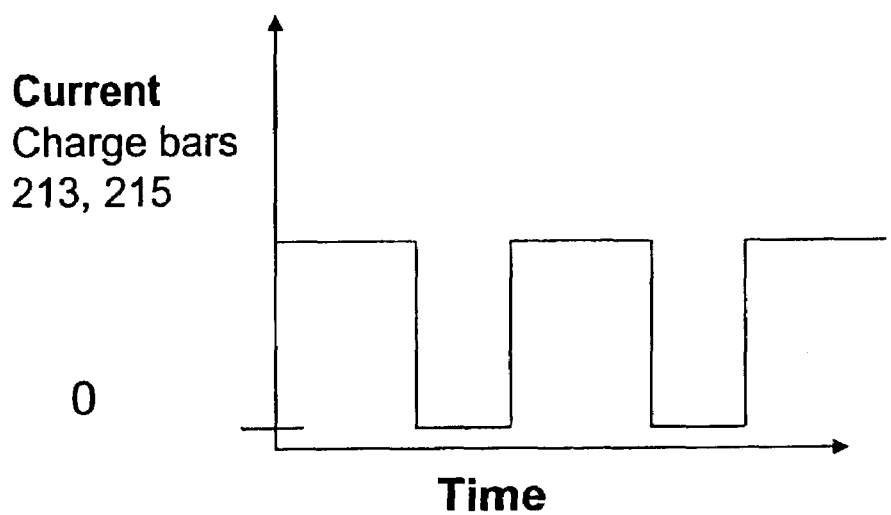
FIGS. 6 and 7 illustrate a second operating format for pin arrays that alternate charged and uncharged states with some overlap.
Figure 7:
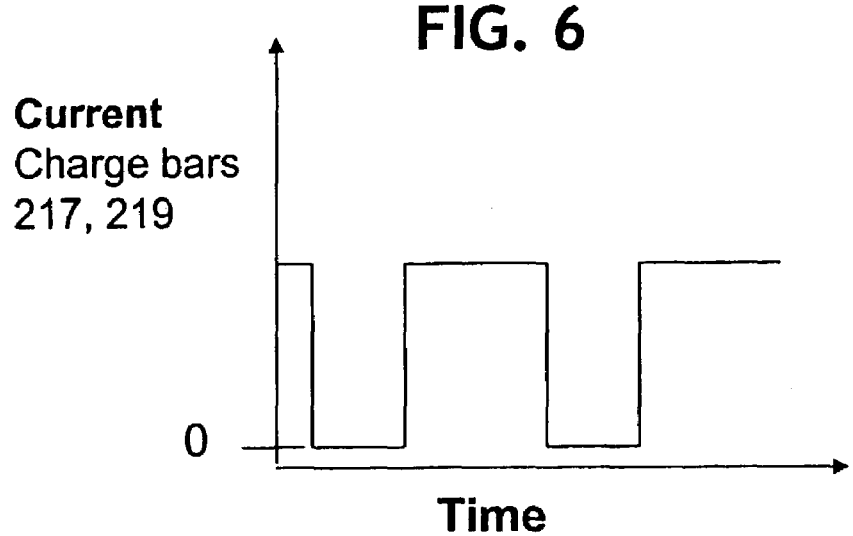

Turning to FIGS. 6 and 7, there is depicted a cycle where all four bars 213, 215, 217 and 219 are switched on for a small time interval before two of the bars, 217 and 219 are turned off. This results in a short duration power spike; however, the electrostatic effect will not be negatively affected.

Figure 8:
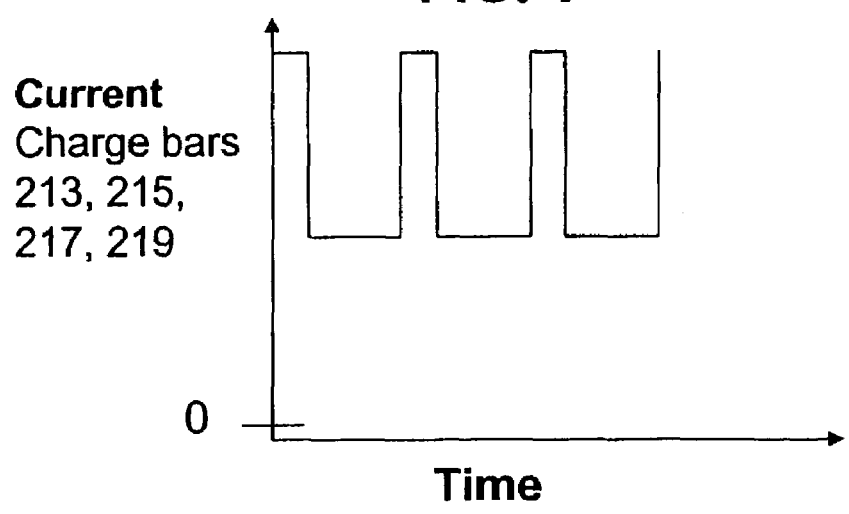
FIG. 8 illustrates yet another operating format for maintaining a charge on all pins in the array continuously but varying the charge level for all pins.

FIG. 8 illustrates yet a different cycle where all four bars 213, 215, 217, and 219 are switched on at all times, but the current to all four bars is varied from high to low simultaneously.

Figure 9:
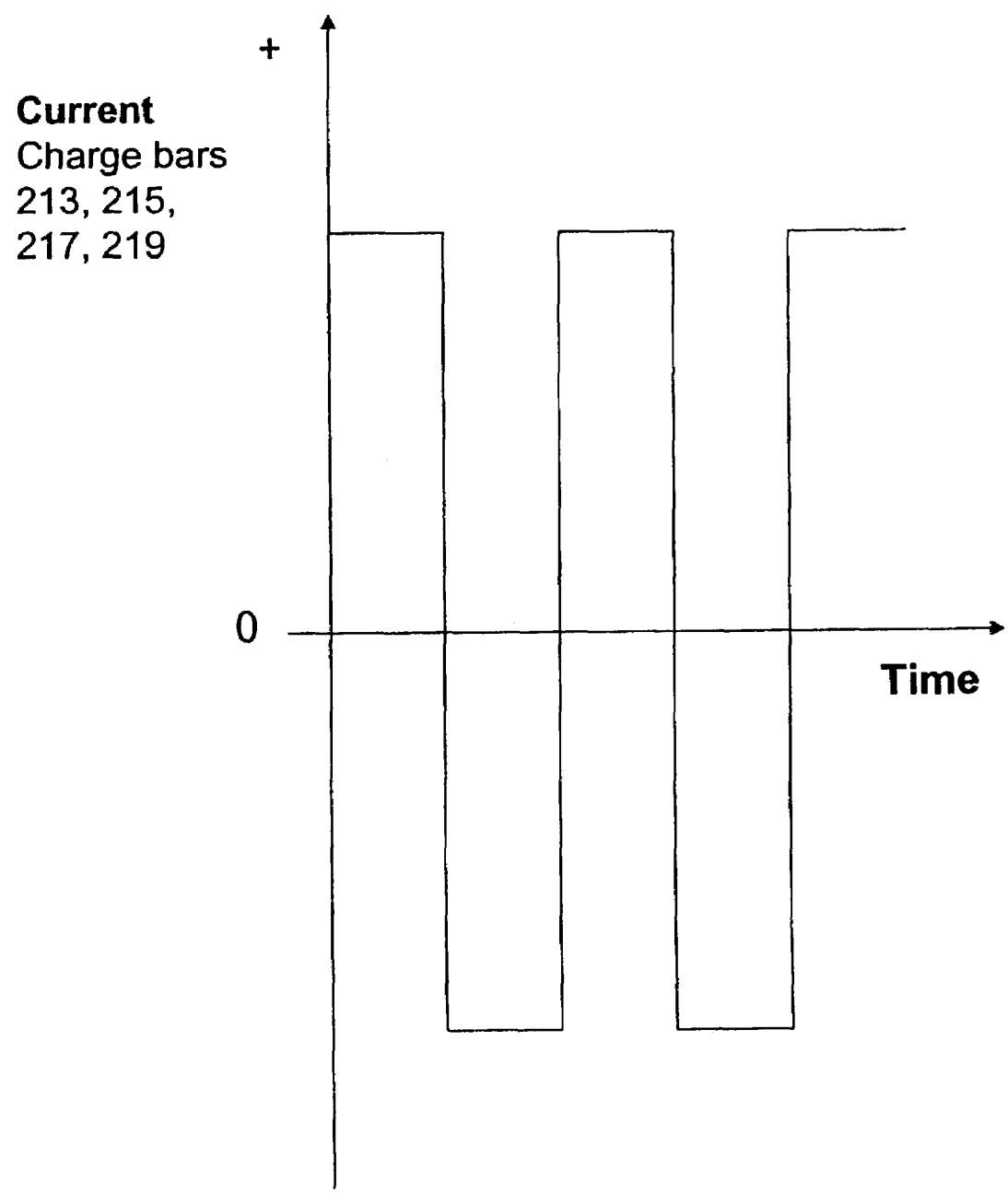
FIG. 9 illustrates an operating format using alternating current to all pins.

FIG. 9 illustrates a cycle using alternating current to all four bars 213, 215, 217 and 219 so that all four rapidly vary from positive to negative current simultaneously.

Figure 10:
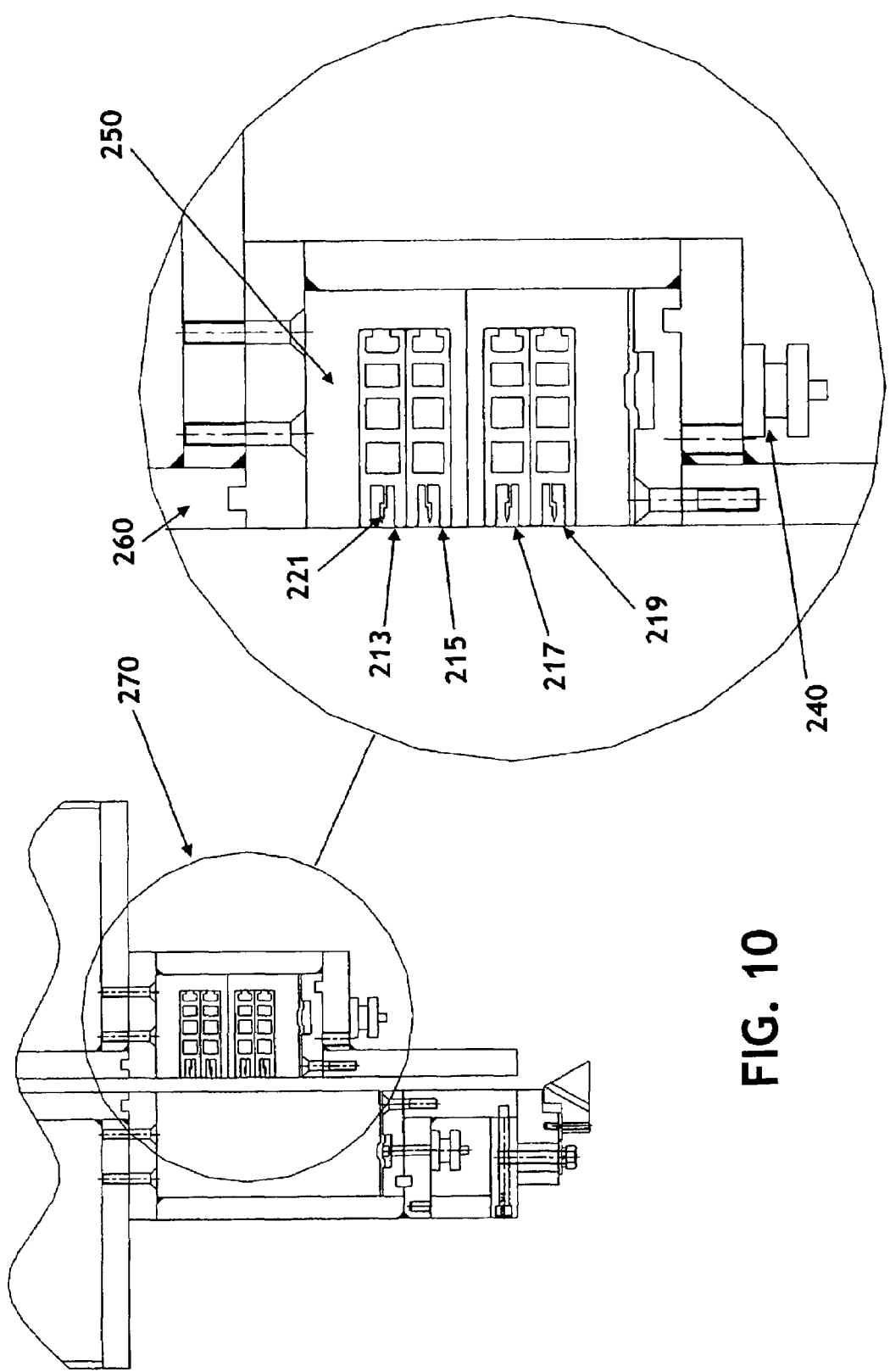
FIG. 10 illustrates an arrangement for easily inserting and removing pin arrays and including sealing means for control of air flow.

Turning to FIG. 10, there is shown a schematic representation of the charge bar assembly 270. The charge bar assembly is made up of a metal bracket 260 with a removable charge bar module 250. The charge bar module 250 is made of a nonconductive material such as polycarbonate and holds the individual charge bars 213, 215, 217, 219. The charge bars attach to the charge bar module using bolts from the opposite side of the electrodes 221. The charge bar module can easily be removed either by sliding the system out from the side of the machine or by removing from the front side. Once the charge bar module is placed an actuator such as air cylinders 240 are used to clamp the assembly in place.

This design offers several advantages. First, the charge bar assembly is easy to remove. During normal production the charge bars must be cleaned periodically. This design minimizes down time by eliminating numerous bolts to hold the system in place. Another charge bar assembly can be ready to re-install as soon as the unit is removed from the machine. Second, the charge bar module contains individual charge bars. If one charge bar malfunctions a replacement can be installed. Third, the assembly minimizes air gaps that can accumulate oils and waxes that are typically produced during the SB manufacturing process. These deposits can accumulate in any air gaps around the charge bars and can result in current loss due to the high operating voltages.

It is apparent that many combinations are possible, and those illustrated are exemplary only. For instance, the same procedure can be used with only 1 active charge bar for any given time interval. For the example shown, charge bar 213 may be switched on while charge bars 215, 217 and 219 are off. For the next interval, charge bar 213 is switched off and charge bar 215 is switched on, keeping charge bars 217 and 219 off. This process can continue until each charge bar has alternatively been switched on for one interval and then the process repeated. In such a case, each charge bar would operate only 25% of the time. In a similar manner the cycle of FIG. 4 can be operated so that each charge bar is charged only 50% of the time.

EXAMPLES

While the invention will be illustrated by means of examples, the examples are only representative and not limiting on the scope of the invention which is determined in reference to the appended claims.

Electrode

Emitter pins are spaced apart at ¼ inch, and recessed at ⅛ inch in a cavity of 0.5 inch high×0.25 inch deep. These 26 inch wide rows (24 effective inch) of pins are stacked up in four, and the distance between pins is ¾ inch (See FIG. 3). The row of pins was manufactured by The Simco Company, Inc., 2257 North Penn Road, Hartfield, Pa. 19440. These electrodes were connected to a high voltage DC source through a single 100 mega ohm resistor to measure the discharge current via the corresponding voltage. The power supply was Model EH3OR3, 0-30 KV, 0-3 MA, 100 watt regulated, reversible with respect to chassis ground, but the negative voltage was applied here although opposite charge may also be used and varied as described above. It was manufactured by Glassman High Voltage, Inc., PO Box 551, Route 22 East, Salem Park, Whitehouse Station, N.J. 08889.

Target

Two target objects were used: a target plate and target deflector. The plate was 3 inches high×26 inches wide conducting steel plate. The deflector was comprised of a multitude of 60 degree angle×⅜ inch wide×1.88 inches long, conducting steel teeth. They were stacked at an angle 32 degrees with respect of the center line of the fiber draw unit with a spacing of ⅛ inch (see FIG. 3). Their steel surfaces were coated with ceramic PRAXAIR LA-7 coating 0.002-0.005 inch thick. This abrasion resistant coating had very little surface resistance of 7 ohms over approximately ¾ inch distance, while the corresponding value of the uncoated steel resistance was close to 0.0002 ohms. These two targets were joined with conducting steel bolts to each other, and connected to another power supply through another 100 megaohm resistor. The power source was the same Glassman power supply, but with different, positive sign, polarity. Thus, the net current between the value at the electrode and that at the target indicates the amount of discharge in the air borne fiber stream, and estimated the amount of charge in the fibers.

Examples A through E

Spinning Conditions

A 17 inches effective wide spin plate of 130 holes/inch was used at 0.65 grams/hole to obtain 0.5 ounce/yd$^2$ at approximately 2 denier/filament spunbond polypropylene fibers. The equipment used was generally in accordance with above-described Matsuki U.S. Pat. No. 3,802,817, incorporated herein in its entirety by reference, except as specifically described herein.

TABLE 1

Results of Electrostatic Charging and Combing

| Example ID | A | B | C | D | E |
|---|---|---|---|---|---|
| Electrode Voltage, V1 KV | 0 | −5 | −5 | −5 | −17 |
| Target Voltage, V2 KV | 0 | 15 | 18 | 18 | 5 |
| Net Current, Inet = A1 − A2 Microamp/inch (1) | 0 | 2.5 | 3.3 | 3.3 | 3.3 |
| Overall Voltage, V1 − V2 KV | 0 | −20 | −23 | −23 | −22 |
| Specific Charge | | | | | |
| MicroCoulomb/g fiber (2) | 0 | 2.51 | 3.34 | 3.34 | 3.34 |
| MicroCoulomb/m$^2$ fiber surface (3) | 0 | 10 | 13.3 | 13.3 | 13.3 |
| Target Deflector | No | No | No | Yes | Yes |
| Web Formation Rating (4) | 0 | 1 | 2 | 5 | 5 |

Note:
(1) Current indication was fluctuated severely, perhaps implying the fluctuating fiber flux
(2) Based on throughput indicated above, and assumed the net charge on fibers
(3) Based on specific fiber surface area = 0.25 m$^2$/g at 2 dpf
(4) Visual subjective rating with 5 being the best As shown in Table 1, the electrostatic charging in this bias circuitry at −20 to −23 improved formation, but much greater improvements were made with target deflector plate with a high voltage bias circuitry.

While this invention is not limited to any theory of operation, it is believed that such dramatic improvement has been made as follows. Typically the fibers are easily moved around in the flowfield due to local fluctuations in velocity which is a characteristic of turbulent flow. As fibers are charged, the resulting electrostatic repulsion force prevents the fibers from roping or clumping together. A typical velocity at the exit of the fiber draw unit is of the order of 6000 m/min. Assume the turbulent fluctuation in velocity is of the order of 10% of the mean velocity, i.e., 6000×10/100=600 m/min. Further assume this fluctuating velocity component is directed perpendicular to the fiber axis. The drag force acting on the fiber due to this fluctuation in velocity would be of the order of 1 dyne. This force would correspond to a filament spacing of 0.02 cm for two 2 dpf and 1 cm long fibers with 3.3 microcoulomb/gram charge according to the Coulombic Law. Essentially there is a balance between the electrostatic force and turbulence induced forces at a length scale of 0.02 cm. Strictly speaking the electrostatic forces insure filament separation on a small length scale.

On the other hand the mechanical deflector provides mixing that helps improve formation defects that are of the order of 1.2 to 2.5 cm in scale. Coupling the electrostatics with the mechanical deflector insures fiber uniformity over a length scale of 0.02 to 2.5 cm. Consider the following analogy. A sand box contains sand of varying depth resulting in a bumpy surface. Dragging a rake across the sand would help reduce surface texture on a length scale equal to the spacing of the tines. Dragging a screen across the sand would help smooth the surface on a length scale of the mesh in the screen. For this analogy the mechanical deflector acts as the rake and electrostatics acts like the screen.

With respect to increased operating time intervals between required cleaning of pins, it is believed that providing periods of uncharged or reduced charge operation of each bar of pins reduces the level of attraction of dust and other contaminants to the pins. Dust particles are generally negatively charged and will be attracted to pins that are positively charged. By reducing the time and/or amount of positive charge on pins, the amount of dust and contaminants attracted to the pins is reduced and distributed more evenly among the pins with the result that run time may be substantially increased.

While the invention has been described in terms of its best mode and other embodiments, variations and modifications will be apparent to those of skill in the art. It is intended that the attached claims include and cover all such variations and modifications as do not materially depart from the broad scope of the invention as described therein.

We claim:

1. Process for forming a nonwoven web comprising the steps of:
   a. providing a source of fibers and/or filaments;
   b. subjecting said fibers and/or filaments to a first electrostatic charge from a first direction using a pin array;
   c. selectively charging pins in said array so that less than the total number of pins is fully charged at some point in time in an operation cycle;
   d. varying the charge level and/or pins that are charged while maintaining the desired electrostatic effect;
   e. subjecting said fibers and/or filaments to a second electrostatic charge from a second direction generally opposite said first direction; and
   f. collecting the fibers and/or filaments on a forming surface to form a nonwoven web.

2. The process of claim 1 wherein said fibers and/or filaments are provided by melt spinning.

3. The process of claim 2 wherein said meltspun filaments are continuous and subjected to pneumatic draw forces in a fiber draw unit prior to being subjected to said electrostatic charge.

4. The process of claim 1 further including the step of directing said fibers and/or filaments against a deflector prior to collection, said deflector device comprising a series of teeth separated by a distance determined by the desired orientation of said fibers and/or filaments in said nonwoven web.

5. The process of claim 1 further including the step of providing said array of pins in a removable device that is removable to facilitate pin extraction.

6. The process of claim 5 wherein said device permits air seals for reduced air movement and reduced disturbance of fiber and/or filament travel.

7. The process of claim 1 further including varying said second electrostatic charge from said second direction.

8. The process of claim 1 further including varying said second electrostatic charge from said second direction according to said first electrostatic charge from said first direction.

9. The process of claim 1 further including subjecting said fiber and/or filaments on the forming surface to a third electrostatic charge.

10. The process of claim 1 further including selectively charging pins in said array so that at some point in time in an operation cycle at least one charging pin in said array has a charge of zero volts.

11. Process for forming a nonwoven web comprising the steps of:
    a. providing a source of fibers and/or filaments;
    b. subjecting said fibers and/or filaments to a first electrostatic charge from a first direction using a pin array;
    c. selectively charging pins in said array so that at some point in time in an operation cycle at least one charging pin in said array has a charge of zero volts;
    d. varying the charge level and/or pins that are charged while maintaining the desired electrostatic effect;
    e. subjecting said fibers and/or filaments to a second electrostatic charge from a second direction generally opposite said first direction; and
    f. collecting the fibers and/or filaments on a forming surface to form a nonwoven web.

12. The process of claim 11 further including varying said second electrostatic charge from said second direction.

13. The process of claim 11 further including varying said second electrostatic charge from said second direction according to said first electrostatic charge from said first direction.

14. The process of claim 11 further including subjecting said fiber and/or filaments on the forming surface to a third electrostatic charge.

* * * * *